(12) United States Patent
Greb et al.

(10) Patent No.: US 12,055,217 B2
(45) Date of Patent: Aug. 6, 2024

(54) ACTUATOR FOR A MOTOR VEHICLE

(71) Applicant: Schaeffler Technologies AG & Co. KG, Herzogenaurach (DE)

(72) Inventors: Peter Greb, Ottersweier (DE); Laszlo Man, Ottersweier (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 436 days.

(21) Appl. No.: 17/284,037

(22) PCT Filed: Oct. 18, 2019

(86) PCT No.: PCT/DE2019/100909
§ 371 (c)(1),
(2) Date: Apr. 9, 2021

(87) PCT Pub. No.: WO2020/083437
PCT Pub. Date: Apr. 30, 2020

(65) Prior Publication Data
US 2021/0381593 A1 Dec. 9, 2021

(30) Foreign Application Priority Data
Oct. 26, 2018 (DE) .......................... 10 2018 126 77.1

(51) Int. Cl.
*F16H 63/34* (2006.01)
*F16H 61/00* (2006.01)
*F16H 61/30* (2006.01)

(52) U.S. Cl.
CPC ..... *F16H 63/3483* (2013.01); *F16H 61/0031* (2013.01); *F16H 61/30* (2013.01)

(58) Field of Classification Search
CPC .. F16H 63/3483; F16H 61/0031; F16H 61/30; F16H 63/3416; F16H 61/0021;
(Continued)

(56) References Cited

U.S. PATENT DOCUMENTS 3,834,276 A 9/1974 Gournelle
4,173,866 A * 11/1979 Farr ........................ F15B 1/027
60/494

(Continued)

FOREIGN PATENT DOCUMENTS

CN 108167434 A 6/2018
CN 207485991 U 6/2018
(Continued)

OTHER PUBLICATIONS

Translation of PCT Written Opinion of PCT/DE2019/100909, Jan. 3, 2020 (Year: 2020).*

(Continued)

*Primary Examiner* — Vinh Luong

(57) ABSTRACT

An actuator for actuating a parking lock and for carrying out at least one other vehicle function in a motor vehicle includes a hydraulic unit and an actuation cylinder, rigidly connected to the hydraulic unit. The hydraulic unit has a hydraulic pump or valves driven by an electric motor. The actuation cylinder is for mechanically actuating a parking lock mechanism of the parking lock. In some embodiments, the actuator has an actuator housing and the actuation cylinder has a cylinder housing that is part of the actuator housing. In some embodiments, the actuation cylinder has a piston and an actuating element, movable via the piston, for actuating the parking lock mechanism.

18 Claims, 3 Drawing Sheets

(58) Field of Classification Search
CPC ........ F16H 57/0436; B60T 7/10; B60T 11/04;
B60T 13/148; B60T 13/588; B61H 13/02
See application file for complete search history.

(56) References Cited

U.S. PATENT DOCUMENTS

| | | | |
|---|---|---|---|
| 2004/0189082 A1 | 9/2004 | Huber, Jr. et al. | |
| 2007/0062769 A1* | 3/2007 | Noh | B60T 13/588 |
| | | | 188/162 |
| 2007/0283735 A1 | 12/2007 | Zahnrad | |
| 2010/0244589 A1* | 9/2010 | Ross | F01L 1/344 |
| | | | 29/598 |
| 2011/0121218 A1* | 5/2011 | Hoppe | H01F 7/081 |
| | | | 251/129.15 |
| 2015/0204329 A1* | 7/2015 | Hoehn | F16D 31/04 |
| | | | 417/364 |
| 2016/0144842 A1* | 5/2016 | Jeon | B60T 7/042 |
| | | | 303/15 |
| 2016/0318496 A1* | 11/2016 | McCash | F16H 63/3483 |
| 2018/0056958 A1* | 3/2018 | Möhlmann | B60T 1/062 |
| 2018/0154881 A1* | 6/2018 | Heubner | F16D 65/14 |
| 2019/0271395 A1* | 9/2019 | Schwegler | F16H 63/3433 |
| 2020/0173508 A1* | 6/2020 | Michels | F16D 65/183 |
| 2021/0284116 A1* | 9/2021 | Ikuma | F16D 55/226 |
| 2023/0193995 A1* | 6/2023 | Greb | F16H 63/3458 |
| | | | 192/219.4 |

FOREIGN PATENT DOCUMENTS

| | | | | |
|---|---|---|---|---|
| DE | 2144672 A1 | 3/1972 | | |
| DE | 102006005185 A1 | 8/2007 | | |
| DE | 102012010172 A1 | 11/2013 | | |
| DE | 102015211305 | 10/2016 | | |
| DE | 102016011148 A1 * | 3/2017 | ............ | F16H 63/68 |
| DE | 102016101486 A1 | 8/2017 | | |
| DE | 102018116815 A1 | 10/2019 | | |
| WO | WO-2011155074 A1 * | 12/2011 | ............ | B60T 13/588 |
| WO | 2014023744 | 2/2014 | | |
| WO | 2015090317 A1 | 6/2015 | | |
| WO | WO 2017056066 A2 * | 4/2017 | | |
| WO | WO-2017211495 A1 * | 12/2017 | ............ | B60T 13/588 |
| WO | WO 2018036583 A1 * | 3/2018 | ............ | F16D 25/08 |
| WO | WO 2021190703 A1 * | 9/2021 | ............ | F16H 63/34 |

OTHER PUBLICATIONS

Machine translation of DE 102016011148A1, Eleonora et al., Mar. 30, 2017 (Year: 2017).*
Translation of WO-2011155074—A1, Isono, Dec. 15, 2011 (Year: 2011).*
Translation of WO-2017211495 A1, Baehrle-Miller, Dec. 14, 2017 (Year: 2017).*

* cited by examiner

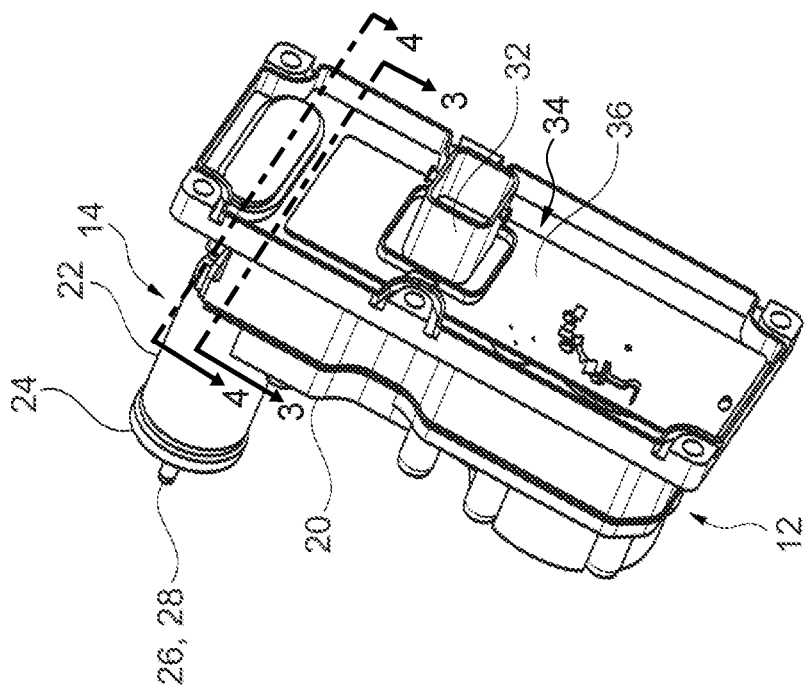
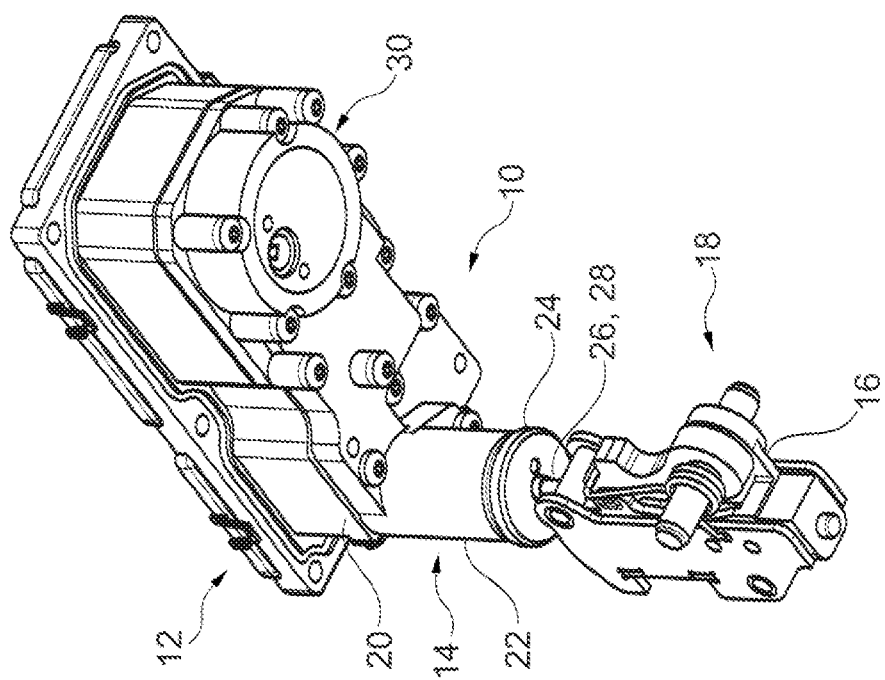
Fig. 2
Fig. 1

ACTUATOR FOR A MOTOR VEHICLE

CROSS-REFERENCE TO RELATED APPLICATIONS

This application is the United States National Phase of PCT Appln. No. PCT/DE2019/100909 filed Oct. 18, 2019, which claims priority to German Application No. DE102018126771.1 filed Oct. 26, 2018, the entire disclosures of which are incorporated by reference herein.

TECHNICAL FIELD

The disclosure relates to an actuator for actuating a parking lock and for carrying out at least one further vehicle function in a motor vehicle, having a hydraulic unit which has a hydraulic pump and/or valves driven by an electric motor.

BACKGROUND

An actuator (or actuator device) is a device that converts electrical signals into physical quantities, such as mechanical movement.

In the present case, this conversion takes place by means of the hydraulic pump of the hydraulic unit driven by an electric motor. This generates corresponding pressures or volume flows at hydraulic connections of the hydraulic unit. Such actuators are also known as EPAs (electric pump actuators) and are used for the hydraulic control of drive train components of motor vehicle drive trains, such as friction clutches, transmissions, parking locks, etc. The carrying out of the further vehicle function can be, for example, actuation of a further motor vehicle component of the motor vehicle or a lubrication/temperature control of at least one motor vehicle component by means of hydraulic fluid pumped by the hydraulic pump.

The publication DE 10 2015 211 305 B3 shows a parking lock/clutch combination with such actuators, friction clutches and a parking lock system. The friction clutches and the parking lock system are connected to the actuators via hydraulic lines. Each of the actuators has a hydraulic pump driven by an electric motor and a set of solenoid valves. The parking lock system has an actuation cylinder for actuating a parking lock mechanism.

SUMMARY

In the actuator according to the disclosure for actuating a parking lock and for carrying out at least one other vehicle function in a motor vehicle, which includes a hydraulic unit, which in turn has a hydraulic pump driven by an electric motor and/or valves, it is provided that the actuator also has an actuation cylinder rigidly connected to the hydraulic unit for mechanically actuating a parking lock mechanism of the parking lock.

In some motor vehicles, there is enough space in the area of the parking lock mechanism not only for the actuation cylinder but also for the units of such an actuator. In this case, installation space can be used more effectively by integrating the actuation cylinder into an actuator that is mounted at this position in the drive train of the motor vehicle.

According to an example embodiment of the disclosure, it is provided that the actuation cylinder has a cylinder housing that is part of a housing of the actuator.

It is provided, for example, that the cylinder housing is connected in one piece to a housing of the hydraulic unit.

According to a further example embodiment of the disclosure, the actuation cylinder in turn has a piston and an actuating element which can be moved by means of the piston for actuating a parking lock mechanism of the parking lock. Such an actuation cylinder is known in principle, but not as an integral part of an actuator with a hydraulic unit, which in turn has a hydraulic pump and/or valves driven by an electric motor.

In this embodiment, the actuating element may be designed as a tappet which protrudes from the actuation cylinder at a head end thereof. When pressure is applied by the hydraulic unit, the piston pushes the actuating element further out of the cylinder housing of the actuation cylinder up to an end position. When this end position is reached, at the latest, the actuation cylinder actuates the parking lock via the parking lock mechanism thereof. In other words, the actuation cylinder is a pressure cylinder.

Furthermore, in this embodiment, the actuation cylinder may have a return spring for returning the actuating element moved by the piston to a rest position. The return spring guides the actuating element back further into the cylinder housing of the actuation cylinder.

According to yet another embodiment of the disclosure, the actuation cylinder has an electromagnetic holding device for holding the actuating element in a position that does not hold the parking lock, i.e., holds it open. This position is usually the end position already mentioned. The holding device may be designed as a simple electromagnet. The piston, for example, forms an armature of this electromagnet.

The carrying out of the at least one further vehicle function is in particular
  (a) a hydraulic actuation of at least one further motor vehicle component and/or
  (b) a lubricating and/or temperature controlling of at least one motor vehicle component by means of hydraulic fluid pumped by the hydraulic pump.

The corresponding motor vehicle component is, for example, a drive train component of a motor vehicle drive train.

According to an example embodiment of the disclosure, it is provided that the hydraulic unit has at least one hydraulic connection for carrying out the at least one further vehicle function, e.g., the hydraulic actuation of the at least one further motor vehicle component. Such hydraulic connections are also known in the common actuators for actuating drive train components of a motor vehicle drive train.

According to a further embodiment, the actuator may have a control unit for controlling the actuator. The hydraulic pump and the valves, as well as optionally also components of the actuation cylinder (such as the electromagnetic holding device), can be controlled via this control unit.

In principle, the actuator can have any type of external electrical contacts. However, the control unit may have a central plug as a central interface for controlling the actuator.

BRIEF DESCRIPTION OF THE DRAWINGS

In the following, the disclosure is explained by way of example with reference to the accompanying drawings using exemplary embodiments. The features shown below can represent an aspect of the invention both individually and in combination. In the drawings:

FIG. 1 shows an actuator with an actuation cylinder according to an example embodiment of the disclosure, and a parking lock mechanism that can be actuated via the actuation cylinder, FIG. 2 shows the actuator from a different perspective.

DETAILED DESCRIPTION

Figure 5:
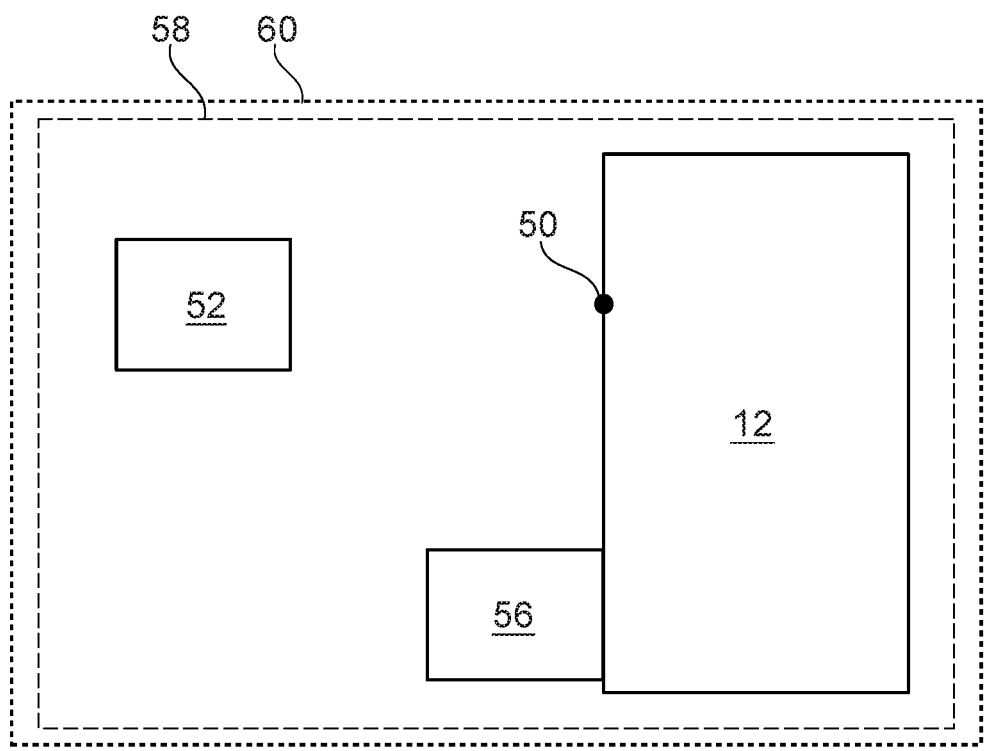
FIG. 5 shows a schematic of an example embodiment of a motor vehicle having a drive train that includes a hydraulic unit and a further motor vehicle component.

FIG. 1 shows an actuator 10 for actuating drive train components of a motor vehicle drive train 58 (schematically represented in FIG. 5). This actuator 10 is often referred to below as an EPA (electric pump actuator). The actuator 10 has a hydraulic unit 12 and an actuation cylinder 14, which is rigidly connected to the hydraulic unit 12 on one side, for mechanically actuating a parking lock mechanism 16 of a parking lock 18. This parking lock 18 is one of the drive train components of the motor vehicle drive train 58.

The actuator 10 has a housing 20. Part of this housing 20 is a cylinder housing 22 of the actuation cylinder 14. The actuation cylinder 14 extends in the direction of the parking lock mechanism 16 and closes there at the open end thereof with a cover 24, via which the cylinder housing 22 is closed. The cover 24 has an opening through which an actuating element 28 designed as a tappet 26 extends from the interior of the actuation cylinder 14 in the direction of the parking lock mechanism 16. The tappet 26 is often referred to as a piston rod. The actuation cylinder 14 is designed here as a pressure cylinder. By means of the actuator 10, the parking lock 18 can be actuated mechanically and at least one further drive train component 52 (FIG. 5), for example a friction clutch, can be actuated hydraulically.

The structure and details of the function of the parking lock mechanism 16 shown here will not be discussed further, since the focus of this disclosure is not on the parking lock 18, but rather on the actuator 10 with the additional mechanical function thereof.

Details of the hydraulic unit 12 cannot be seen in FIG. 1, since it is an external view of the actuator 10. Nevertheless, the shape of the housing 20 provides indications of some of the components enclosed by the housing 20. In the housing part of the housing 20, which houses the hydraulic unit 12, a pump dome 30 can be seen, under which there is a hydraulic pump 56 (shown schematically in FIG. 5) driven by an electric motor.

In general, an actuator (or actuator device) is to be understood as a device that converts electrical signals into mechanical movement or other physical (control) variables. This is done here via the hydraulic pump 56 driven by the electric motor. The actuator 10 shown here is therefore also referred to as an EPA and as such is used for the hydraulic control of at least one drive train component.

FIG. 2 shows the actuator 10 from a different perspective, namely from the side of the actuator 10 facing away from the actuation cylinder 14. There is another unit of the actuator 10 with a (central) plug 32, namely the control unit 34 of the actuator 10. The control unit 34 is shown open here and provides a clear view of a circuit board 36 of the control unit 34. The control electronics of the control unit 34 are interconnected on the circuit board 36. The essential components of the actuator 10 are controlled electrically/electronically via this control unit 34. The electrical/electronic interface to the outside is the (central) plug 32.

Figure 4:
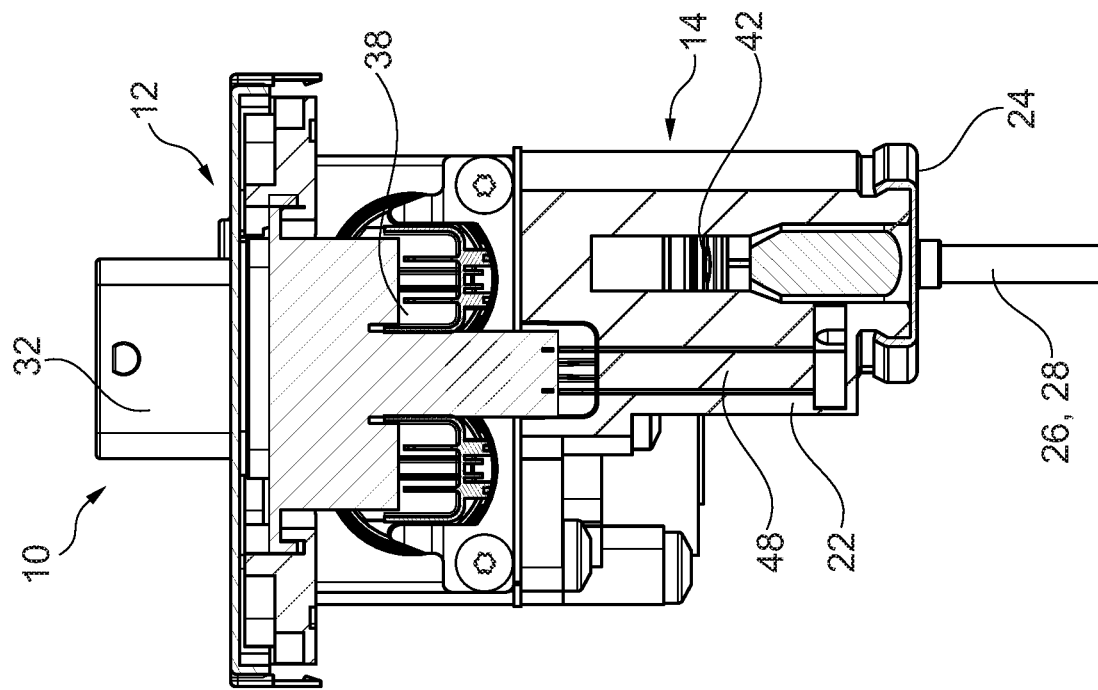
FIG. 4 shows the actuator in a second cross-sectional view taken from FIG. 2.
Figure 3:
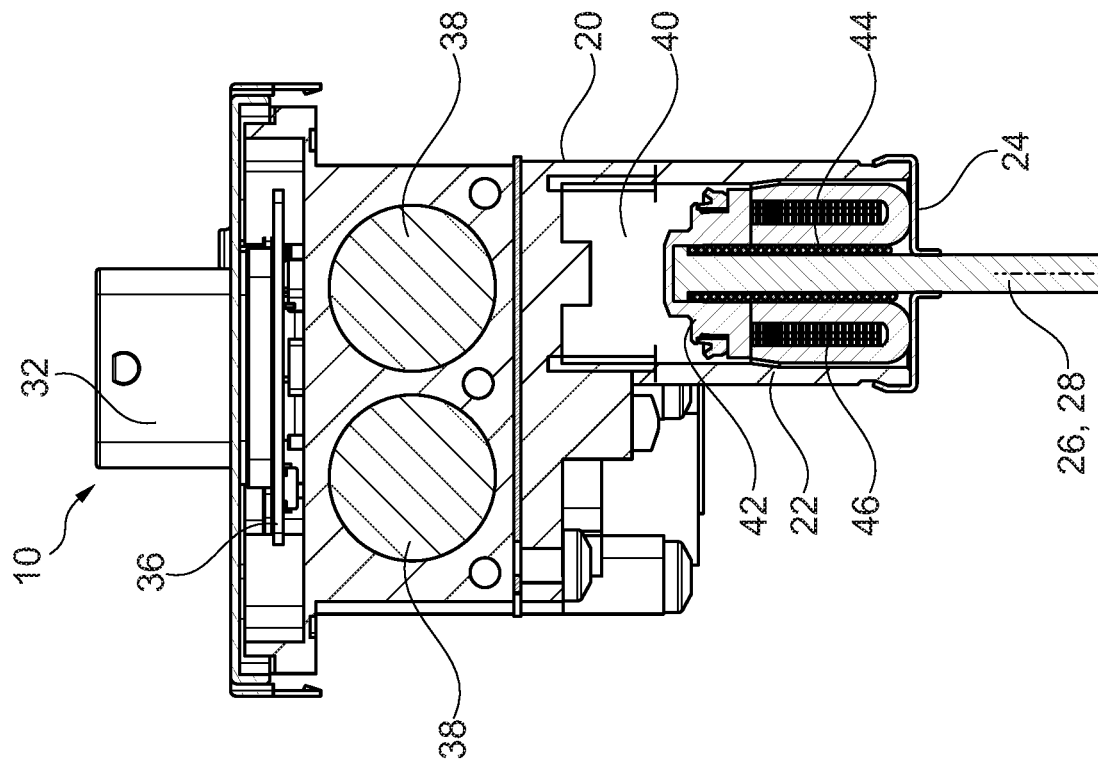
FIG. 3 shows the actuator in a first cross-sectional view taken from FIG. 2.

FIGS. 3 and 4 show sectional views through such a part of the actuator 10 that includes the actuation cylinder 14. In both figures it can be clearly seen that the cylinder housing 22 is part of the housing 20 of the EPA, i.e., the actuator 10. Furthermore, (solenoid) valves 38 of the hydraulic unit 12 can be seen, via which the corresponding hydraulic channels for controlling the drive train components are enabled or blocked.

FIG. 3 shows the structure of the actuation cylinder 14 in detail. This is a hydraulic cylinder, more precisely a single-acting hydraulic cylinder. In the interior 40 of the cylinder 14 there is a piston 42 which drives a front part of the tappet 26 further out of the open end of the actuation cylinder 14 against the restoring force of a return spring 44 (designed as a compression spring) when the pressure is applied accordingly. The piston 42 is controlled via the pressure build-up by the hydraulic pump and the switching position of the valves 38. The piston 42 itself is made of ferromagnetic material. In the interior 40 of the cylinder 14 there is also an electromagnetic holding device 46 for holding the piston 42 in the advanced position in which the tappet 26 protrudes far out of the cylinder housing and actuates the parking lock 18 or the parking lock mechanism 16 thereof. The electromagnetic holding device 46 is designed as a simple holding magnet.

FIG. 4 shows in particular the measures for making electrical contact with the electromagnetic holding device 46. This takes place via what is termed a lead frame 48.

FIG. 5 shows a schematic of an example embodiment of the hydraulic unit 12 having a hydraulic connection 50 for hydraulic actuation of a further motor vehicle component 52 and/or lubricating and/or temperature control of the further motor vehicle component 52, all of which reside within a motor vehicle drive train 58 of a motor vehicle 60.

In the following, embodiments of the disclosure and the features thereof are to be described again in other words:

The EPA 10 has, as central components, the hydraulic unit 12 with a hydraulic pump 56 driven by an electric motor and additional (control) valves 38 for interconnecting the various "consumers" and the central control electronics of the control unit 34 in a common housing 20. This EPA 10 is extended in the basic version with two "consumers" (for example for cooling oil circulation and clutch actuation) by the actuation cylinder 14 so that the cylinder housing 22 thereof is integrated into the housing 20 of the EPA. The actuation cylinder 14 has a linearly displaceable actuating piston 42. Via the valves 38 designed as solenoid valves, this piston 42 can be displaced against the load of the (closed) parking lock mechanism 16 by the hydraulic pressure generated by the pump 56 (whereby the parking lock 18 is opened).

The electromagnetic holding device 46 arranged in the cylinder 14 can fix the piston 42 in the actuated position and also hold this position without pressure.

The electromagnetic holding device 46 is supplied with power via lead frames 48 integrated in the (e.g., plastic) housing, which are connected to the circuit board 36 in the assembly direction when the actuator 10 is assembled. This eliminates the need for connecting cables and connecting plugs, as well as a separate circuit board that is otherwise required for controlling the valves 38 or the electromagnetic holding device 46.

In other words, the known EPA concept with electromechanical hydraulic pump 56, valve(s) 38, and control electronics is here expanded to include a solenoid valve and an actuation cylinder 14 designed as a pressure cylinder, which is integrated into the EPA housing 20. The EPA 10 has a mechanical interface for actuating the parking lock, namely the tappet 26 of the pressure cylinder (also known as the piston rod). The power supply and control of all components is accommodated in the housing 20; there are no connecting cables and connecting plugs, nor a separate circuit board for controlling the valve 38 or the electromagnetic holder. A wire-frame contact 48 is used.

The EPA 10 offers a high degree of component integration without physical separation and a housing 20 for all functions. The EPA 10 may be arranged in the vicinity of the mechanical parking lock 18; all other functions such as oil supply cooling, clutch actuation, and gear actuation can be achieved using freely deployable hydraulic lines.

REFERENCE NUMERALS

- 10 Actuator
- 12 Hydraulic unit
- 14 Actuation cylinder
- 16 Parking lock mechanism
- 18 Parking lock
- 20 Housing
- 22 Cylinder housing
- 24 Cover
- 26 Tappet
- 28 Actuating element
- 30 Pump dome
- 32 (Central) connector
- 34 Control unit
- 36 Circuit board
- 38 Valves
- 40 Interior
- 42 Piston
- 44 Return spring
- 46 Electromagnetic holding device
- 48 Lead frame
- 50 Hydraulic connection
- 52 Further motor vehicle component
- 56 Hydraulic pump
- 58 Motor vehicle drive train
- 60 Motor vehicle

The invention claimed is:

1. An actuator for actuating a parking lock in a motor vehicle, comprising:
    a hydraulic unit comprising:
        an actuator housing;
        two solenoid valves disposed within the actuator housing;
        a hydraulic pump; and
        an actuation cylinder having a cylinder housing connected in one piece to the actuator housing, the actuation cylinder configured for mechanically actuating a parking lock mechanism of the parking lock; and
        the two solenoid valves configured to selectively actuate: i) the parking lock mechanism, and ii) a further motor vehicle component outside of the actuator.

2. The actuator of claim 1, wherein the actuation cylinder comprises:
    a piston; and
    an actuating element, movable by means of the piston, for actuating the parking lock mechanism.

3. The actuator of claim 2, wherein:
    the actuating element is designed as a tappet with a head end; and
    the tappet protrudes from the actuation cylinder at the head end.

4. The actuator of claim 2, wherein the actuation cylinder comprises a return spring for returning the actuating element moved by the piston to a rest position.

5. The actuator of claim 2, wherein the actuation cylinder comprises an electromagnetic holding device for holding the actuating element in a position holding the parking lock open.

6. The actuator of claim 5, wherein the piston forms an armature for the electromagnetic holding device.

7. The actuator of claim 2, wherein the piston is configured to selectively receive hydraulic pressure and move within the actuation cylinder to actuate the parking lock mechanism.

8. The actuator of claim 1, wherein the hydraulic unit comprises a hydraulic connection configured for fluidly connecting the actuator housing to the further motor vehicle component outside of the actuator.

9. The actuator of claim 1, further comprising an electronic control unit configured for controlling the actuator, the electronic control unit disposed within the actuator housing.

10. The actuator of claim 9, wherein the electronic control unit is configured to control the hydraulic pump and the two solenoid valves.

11. The actuator of claim 10, wherein the electronic control unit comprises a circuit board.

12. The actuator of claim 10, wherein the electronic control unit includes an electrical plug configured as an electronic interface.

13. An actuator for actuating a parking lock in a motor vehicle, comprising:
    a hydraulic unit comprising:
        an actuator housing;
        a hydraulic pump; and
        an actuation cylinder having a cylinder housing connected in one piece to the actuator housing, the actuation cylinder configured for mechanically actuating a parking lock mechanism of the parking lock; and
        the actuator housing includes a hydraulic connection configured to fluidly connect the actuator housing to a further motor vehicle component so that the first-further motor vehicle component can be actuated via the hydraulic pump, and
    wherein the further motor vehicle component is outside of the actuator.

14. The actuator according to claim 13, wherein the first-further motor vehicle component is a clutch.

15. The actuator according to claim 13, wherein the first-further motor vehicle component is a gear.

16. The actuator according to claim 13, further comprising an electronic control unit disposed within the actuator housing, the electronic control unit configured to control the hydraulic pump and actuation of the further motor vehicle component.

17. The actuator according to claim 13, further comprising a plurality of solenoid valves configured to selectively actuate the parking lock mechanism and the first further motor vehicle component.

18. An actuator for actuating a parking lock in a motor vehicle, comprising:
    a hydraulic unit comprising:
        an actuator housing;
        a hydraulic pump configured to be driven by an electric motor; and an actuation cylinder having a cylinder housing connected in one piece to the actuator housing, the actuation cylinder configured for mechanically actuating a parking lock mechanism of the parking lock; and the actuator housing includes
- a hydraulic connection
  - configured to provide at least one of lubrication or temperature control for a further motor vehicle component via hydraulic fluid pumped by the hydraulic pump
  - the further motor vehicle component arranged outside of the actuator.

\* \* \* \* \*